(12) United States Patent
Hamann et al.

(10) Patent No.: US 6,784,777 B2
(45) Date of Patent: Aug. 31, 2004

(54) INDUCTION APPARATUS WITH DAMPING FEATURE

(75) Inventors: Jens Hamann, Fürth (DE); Bernd Segger, Erlangen (DE)

(73) Assignee: Siemens Aktiengesellschaft, München (DE)

(*) Notice: Subject to any disclaimer, the term of this patent is extended or adjusted under 35 U.S.C. 154(b) by 129 days.

(21) Appl. No.: 09/973,487

(22) Filed: Oct. 9, 2001

(65) Prior Publication Data

US 2003/0067375 A1 Apr. 10, 2003

(30) Foreign Application Priority Data

Oct. 9, 2001 (DE) .......................................... 100 49 817

(51) Int. Cl.$^7$ .............................................. H01F 27/02
(52) U.S. Cl. .................... 336/84 M; 336/178; 336/212; 310/51; 310/71
(58) Field of Search ................................. 336/83, 84 R, 336/84 M, 84 C, 178, 173, 212, 225, 229; 310/51, 71, 85, 208

(56) References Cited

U.S. PATENT DOCUMENTS 4,968,912 A * 11/1990 Shahamat et al. ............ 310/71

FOREIGN PATENT DOCUMENTS

| DE | 24 33 618 | 1/1976 |
| DE | 28 34 378 | 11/1979 |
| DE | 38 26 282 A1 | 2/1990 |
| EP | 0 117 764 | 9/1984 |
| EP | 0 681 361 B1 | 11/1995 |

* cited by examiner

Primary Examiner—Tuyen T. Nguyen
(74) Attorney, Agent, or Firm—Henry M. Feiereisen

(57) ABSTRACT

An induction apparatus includes a winding arrangement having a winding start and a winding end for inducing a magnetic field in a magnetizable core; and a lossy, magnetizable device through which and/or about which the winding start and the winding end of the winding arrangement is so disposed as to induce a magnetic flux in the magnetizable device. This arrangement prevents an electric breakdown at the star point of winding strands of synchronous motors.

10 Claims, 2 Drawing Sheets

INDUCTION APPARATUS WITH DAMPING FEATURE

CROSS-REFERENCES TO RELATED APPLICATIONS

This application claims the priority of German Patent Application Serial No. 100 49 817.5, filed Oct. 9, 2000, the subject matter of which is incorporated herein by reference.

BACKGROUND OF THE INVENTION

The present invention relates, in general, to an induction apparatus for inducing a magnetic filed in a magnetizable core, and more particularly to exciter coil windings for electric machines. The present invention further relates to induction arrangements with several induction apparatuses, and to a corresponding method for operating an electric machine.

Electric machines, in particular synchronous motors, are frequently configured to include specially shaped winding wires placed in slots provided in the rotor or stator. The wires are connected at the winding head to form winding strands. A single winding strand can be connected to several coils, with the number of coils depending on the number of poles. With three-phase machines, at least one winding strand is provided per phase, and the winding strands are connected at a star point. Thus, for a three-phase synchronous motor with four poles, for example, three winding strands are connected at the star point, with each winding strand having four coils. The input voltages of the three-phase current are applied to outer terminals of the respective winding strands, with the outer terminals positioned opposite to the star point.

The windings of linear motors and increasingly also of synchronous motors that are required to provide a high torque are fabricated by a coiling technique in which the winding is placed on a coil body that is separate from the body to be magnetized. This means that the magnetic cores, which are made of transformer sheets, are formed with teeth that serve as a pole core. The pre-fabricated coils are placed on the individual pole cores and suitably connected. The pre-fabricated coils include a carrier or coil body made of an electrically insulating material, and insulated copper wires wound on the carrier, typically by using a machine. Optionally, the carrier may be removed after the winding process so long as the winding body itself has sufficient inherent stability.

FIG. 1 shows a circuit diagram of a conventional winding strand of a three-phase machine, including four coils 1 made by using the afore-described coiling technique. The coils 1 which are depicted as hexagons are connected in series. Voltage is applied via input terminal 2 to one end of the winding strand. The other end of the winding strand, distal to the terminal 2, terminates in a star point 3. As mentioned above, the additional winding strands are connected at the star point 3.

FIG. 2 shows the asymmetric equivalent circuit diagram of the electric circuit illustrated in FIG. 1. The inductance of each coil 1 is designated with reference character "L", whereby the individual inductances L are connected in series, as is evident from FIG. 1. Each coil 1 is capacitively coupled to tile pole core 5 (see FIG. 3) on which the coil 1 is mounted. The respective capacitances C are illustrated in FIG. 2 as bypass capacitors C connected to ground, whereby the ground is formed by the magnetic core. Voltage U is applied to the input terminal 2.

The actual configuration of a magnetic pole with coil winding is depicted in FIG. 3. A magnetic core 4 includes a tooth or pole core 5 which is made from transformer sheets. A coil body 6 is mounted on the pole core 5 and includes a winding 7 which is wound onto the coil body 6 in accordance with the aforedescribed coiling technique. The coil body 6 provides insulation between the winding 7 and the pole core 5. The insulation is sized so as to prevent an electric breakdown between the winding 7 and the pole core 5.

Synchronous motors and in particular synchronous linear motors are frequently controlled by using converters. The converters typically generate rectangular control voltages. In particular with large converters, electric breakdown may occur at the star point of the three-phase motors that are made using the aforedescribed coiling technique.

Similar problems are increasingly encountered with electric machines in the event of transient overvoltages. For this reason, overvoltages are limited to prevent breakdowns. German Pat. No. DE-A-38 26 282 describes electric machines having voltage-dependent metal-oxide resistors connected in parallel with a coil to limit transient overvoltages. German Pat. No. DE-B-28 34 378 describes short-circuiting of winding sections for damping transverse fields. Similarly, German Pat. No. DE-A-24 33 618 describes a synchronous machine with rods to dampen transverse fields to thereby protect against transient overvoltages.

European Pat. No. EP-A-0 117 764 describes placing ferroelectric insulators between adjacent coil turns of a winding for suppressing overvoltages that are caused by resonant phenomena. European Pat. No. EP-B-0 681 361 addresses the problem of higher harmonics encountered in converters and rectifiers with power thyristors. The damping winding is herein connected with capacitors to form resonant circuits. The resonant circuits have a resonant frequency which is set 6n times higher than the fundamental frequency of the synchronous machine. In this fashion, higher harmonics of the fundamental wave can be absorbed.

Although these proposals are appealing, they still do not address the problem of electric discharge or breakdown at the star point of a synchronous motor made by the aforedescribed coiling technique.

It would therefore be desirable and advantageous to provide an improved induction apparatus to obviate prior art shortcomings and to protect against a breakdown at the star point. It would further be desirable and advantageous to provide an improved process for operating electric machines by reducing the risk of breakdown at the star point.

SUMMARY OF THE INVENTION

According to one aspect of the present invention, an induction apparatus includes a winding arrangement having a winding start and a winding end for inducing a magnetic field in a magnetizable core, a lossy, magnetizable device through which and/or about which the winding start and the winding end of the winding arrangement is so arranged as to induce a magnetic flux in the magnetizable device.

Advantageously, the magnetizable device is provided in the form of a ring-shaped magnetic core or a rod-shaped magnetic core, which may be made of ferrite.

The induction apparatus according to the present invention is especially effective when the winding arrangement is fabricated by a coiling technique in which the windings are wound layer-by-layer on a separate coil body.

According to another aspect of the present invention, an induction apparatus includes a winding arrangement for inducing a magnetic field in a magnetizable core, wherein a shielding device is disposed between the winding arrangement and the magnetizable core, with an electric resistor connecting the shielding device to the magnetizable core.

According to another feature of the present invention, the shielding device includes an electrically conductive shielding foil which may fully, or only partially, cover the inner surface of the winding arrangement, when the winding arrangement is made by using the aforedescribed coiling technique.

According to still another aspect of the present invention, a method of operating an electric machine of a type having at least one winding arrangement and a magnetizable core, includes the steps of applying a control voltage or a control current to the at least one winding arrangement; and using a lossy capacitive and/or inductive element to dampen a capacitive bypass current flowing between the winding arrangement and the magnetizable core.

In general, the invention is based upon the recognition that a coil winding together with the pole core, which is connected to electric ground, forms an L-C oscillating circuit. When several coils of a winding strand are connected in series, a recurrent network circuit of parasitic elements is formed, as shown in FIG. 2. These parasitic elements include inductances and bypass capacitances of the exciter coils. Principally, this network circuit represents an undamped resonant circuit. If this resonant circuit is not damped further in addition to the naturally occurring damping, then overvoltages of, for example, a factor 4 can readily occur at the resonant frequency. This may cause breakdowns at the star point.

Supply of voltages at frequencies in the range of the resonant frequency of the exciter coils may not always be preventable. In particular, when controlling synchronous motors by using converters, frequencies near the specific resonant frequencies of the employed winding strands are generally produced. However, problems normally appear only when the spectral content of the supplied interference voltage in the range of this resonant frequency is fairly high. This is indicated, for example, by a superposition of the interference voltage produced by the converter on the rectangular voltage, whereby a significant ringing at the resonant frequency is observed at the edges of the rectangular voltage. The resonant amplification of the ringing by the recurrent network circuit of the winding strand causes pronounced overvoltages and possibly also breakdowns at the star point 3.

The present invention resolves these problems by damping the resonance amplification, in particular by damping the capacitive bypass current between the exciter coil and the pole core. Alternatively, the capacitive bypass current can produce a magnetomotive force in a lossy magnetic core. The losses in the magnetic core then dampen the capacitive bypass current and attenuate the oscillation in the recurrent network. Alternatively, the capacitive bypass current can be damped by tapping the bypass current via an ohmic resistor.

BRIEF DESCRIPTION OF THE DRAWING

Other features and advantages of the present invention will be more readily apparent upon reading the following description of preferred exemplified embodiments of the invention in conjunction with the appended drawing, in which.

DETAILED DESCRIPTION OF PREFERRED EMBODIMENTS

Figure 1:
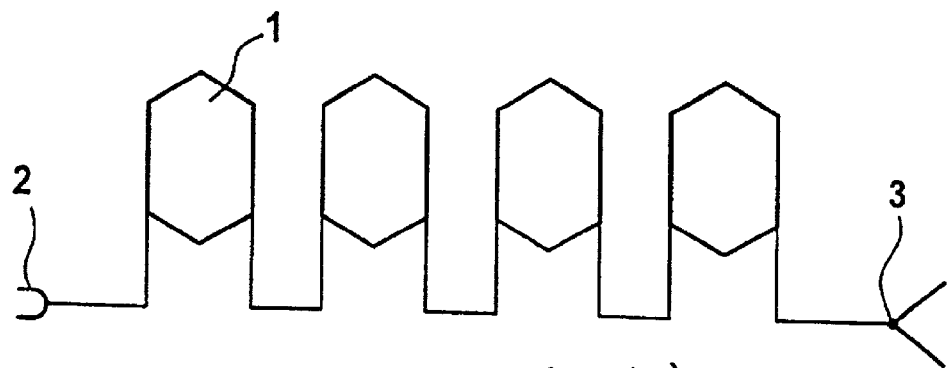
FIG. 1 is a conventional electric circuit diagram of a winding strand.
Figure 2:
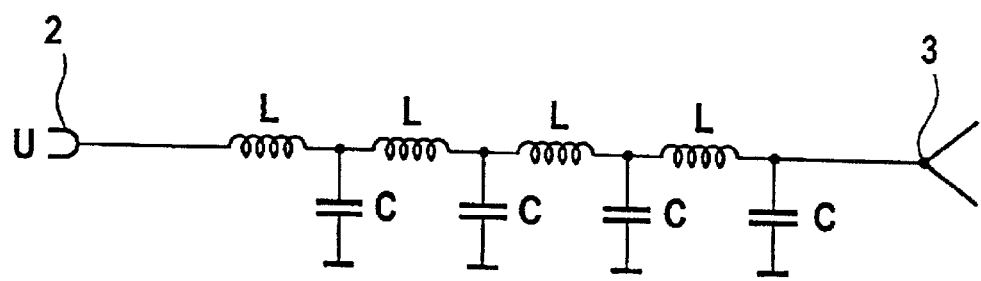
FIG. 2 is an electric equivalent circuit diagram of the circuit diagram of FIG. 1.
Figure 3:
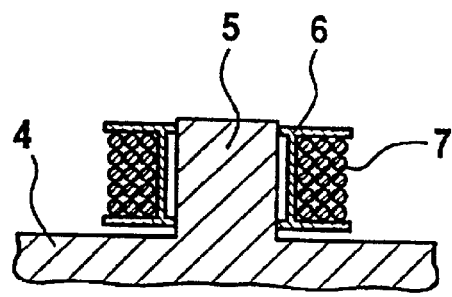
FIG. 3 is a cross sectional illustration of a conventional exciter coil winding.
Figure 4:
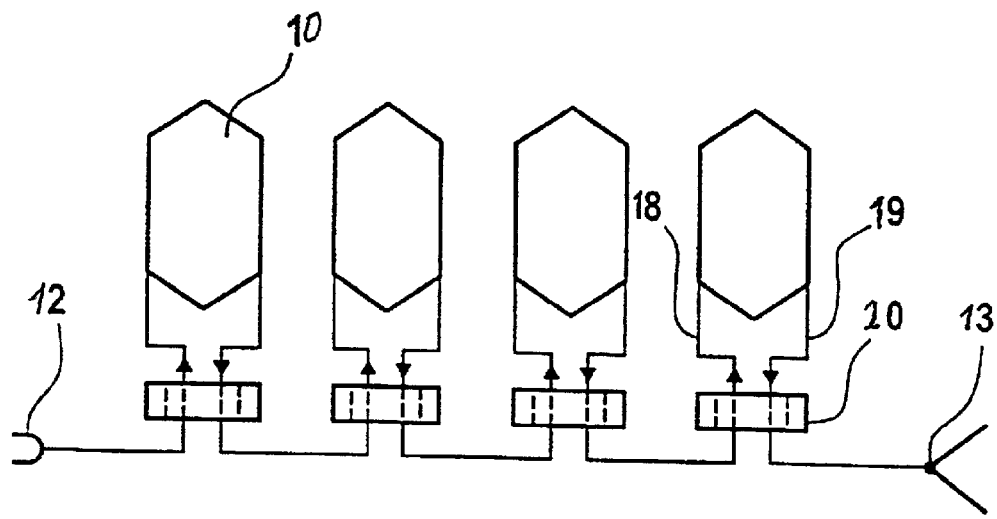
FIG. 4 is an electric circuit diagram of a winding strand according to the present invention.

Turning now to the drawing, and in particular to FIG. 4, there is shown an electric circuit diagram of a winding strand according to the present invention, including exciter coils 10. The coils 10 of the winding strand, for example, for a particular phase of a synchronous motor, are connected in series between an input terminal 12 and a star point 13. Each coil 10 has a winding start 18 and a winding end 19 which each extend through a lossy, ring-shaped magnetic core 20. Both winding ends 18, 19 of the coil 10 may also be wound onto the lossy magnetic core 20 for improved efficiency.

The operating current passes through or circulates about the lossy magnetic core 20 in opposite directions when entering the coil and exiting from the coil, respectively. The operating current hence does not produce a significant magnetic field in the magnetic core 20. On the other hand, while the capacitive bypass current is supplied to the exciter coil 10 via the lossy magnetic core 20, the capacitive bypass current is no longer conducted through the lossy magnetic core 20 when exiting the coil 10 into the pole core. Thus, the capacitive bypass current of the coil 10 excites a magnetic field in the lossy magnetic core 20. The losses in the magnetic core 20 attenuate the bypass current and thus also the oscillation in the recurrent network. As a result, smaller overvoltages are produced at the star point 13, thereby decreasing the frequency of breakdowns in this area, which could otherwise damage the main insulation of the motor.

Advantageously, the lossy magnetic core 20 can be ring-shaped or rod-shaped.

Losses in the magnetic core 20 can be produced, for example, by magnetic reversal, hysteresis and/or eddy currents. Advantageously, the magnetic core 20 may be made of ferrite which has losses that increase with increasing frequency.

Figure 5:
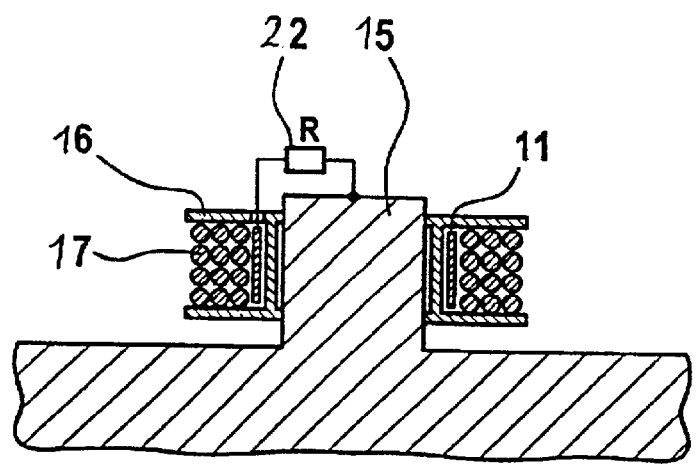
FIG. 5 is a cross sectional view of another embodiment of an exciter coil winding according to the present invention.

Referring now to FIG. 5, there is shown a cross sectional view of another embodiment of an exciter coil winding according to the present invention which is different from that of FIG. 4. The coil winding includes a coil body 16 with windings 17 which is typically formed of transformer sheets and disposed on a pole core 15. An insulating shielding foil 11 is placed on the bottom of the coil body 16. Preferably, the shielding foil 11 completely extends around the coil body 16 beneath the coil winding 17. The shielding foil 11 is connected, for example, via a bypass resistor 22 to the stator pole core 15 of the motor. The shielding foil 11 may optionally also be connected to the leakage resistor 22 through the coil body 16. The ohmic resistance 22 attenuates the capacitive bypass current of the exciter coil. This in turn reduces the amplification at resonance and voltage transients, thereby also decreasing the frequency of breakdowns.

The shielding foil 11 is made of a highly conductive metal, for example, aluminum, or of a suitably metallized foil.

When the exciter coil is installed on the pole core 15, the shielding foil 11 and bottom of the coil body 16 are disposed between the winding 17 and the pole core 15. This represents an electric circuit with a first capacitance disposed between the lowermost winding layer of the winding 17 and the shielding foil 11, and a second capacitance disposed between the shielding foil 11 and the pole core 15. To protect against an electric breakdown between the winding 17 and the shielding foil 11, the insulating materials of the coil winding 17, the shielding foil 11 and the coil body 16 should be so selected that the first capacitance between the winding 17 and the shielding foil 11 is substantially greater than the second capacitance between the shielding foil 11 and the pole core 15. Moreover, the bypass resistor 22 should be suitably matched to the first and second capacitances by taking into consideration the frequencies to be damped.

Persons skilled in the art will understand that the illustration of the exciter coil of FIG. 5 is can also be applied to the induction arrangement shown in FIG. 4. The induction arrangement according to the present invention for the respective winding strand protects against breakdown at the star point 13, thereby preventing damage of the main insulation of the motor.

In accordance with the present invention, and as shown in FIGS. 4 and 5, a capacitive bypass current flowing in an electric machine during its operation between at least one exciter coil and the magnetic core can be damped, in one case, by using a lossy, capacitive component, and in another case, by using a lossy inductive component. Of course, combinations of both damping options should also be considered as being covered by this disclosure.

While the invention has been illustrated and described as embodied in an induction apparatus with damping feature, it is not intended to be limited to the details shown since various modifications and structural changes may be made without departing in any way from the spirit of the present invention.

What is claimed as new and desired to be protected by Letters Patent is set forth in the appended claims.

What is claimed is:

1. An induction apparatus for use in an electric machine, comprising:
    a pole core;
    a winding arrangement having a winding start and a winding end for inducing a magnetic field in the pole core in response to an electric current flowing through the winding arrangement; and
    a lossy, magnetizable device so interacting with the winding start and winding end of the winding arrangement that a magnetic flux is induced in the magnetizable device substantially only by a capacitive bypass current.

2. The induction apparatus of claim 1, wherein the winding start and the winding end of the winding arrangement extend through the magnetizable device in opposite directions.

3. The induction apparatus of claim 1, wherein the winding start and the winding end of the winding arrangement extend about the magnetizable device in opposite directions.

4. The induction apparatus of claim 1, wherein the winding start and the winding end of the winding arrangement extend through and about the magnetizable device in opposite directions.

5. The induction apparatus of claim 1, wherein the magnetizable device includes one of a ring-shaped magnetic core and rod-shaped magnetic cove.

6. The induction apparatus of claim 1, wherein the magnetizable device is made, at least partially, of ferrite.

7. The induction apparatus of claim 1, wherein the winding arrangement is wound layer-by-layer on a coil body that is separate from the pole core.

8. The induction apparatus of claim 1 for interaction with at least one further sad induction apparatus, wherein the winding arrangement of the induction apparatus and the winding arrangement of said further induction apparatus are connected in series to form at least one winding strand.

9. The induction apparatus of claim 1 for interaction with at least one further said induction apparatus, wherein the winding arrangement of the induction apparatus and the winding arrangement of said further induction apparatus have winding strands which are connected with one another at a star point.

10. The induction apparatus of claim 1, wherein the magnetizable device is located proximate to the pole core.

* * * * *

UNITED STATES PATENT AND TRADEMARK OFFICE
CERTIFICATE OF CORRECTION

PATENT NO. : 6,784,777 B2
DATED : August 31, 2004
INVENTOR(S) : Hamann et al.

It is certified that error appears in the above-identified patent and that said Letters Patent is hereby corrected as shown below:

Column 6,
Line 22, replace "cove" with -- core --
Line 29, replace "sad" with -- said --

Signed and Sealed this

Fourteenth Day of December, 2004

JON W. DUDAS
*Director of the United States Patent and Trademark Office*